UNITED STATES PATENT OFFICE.

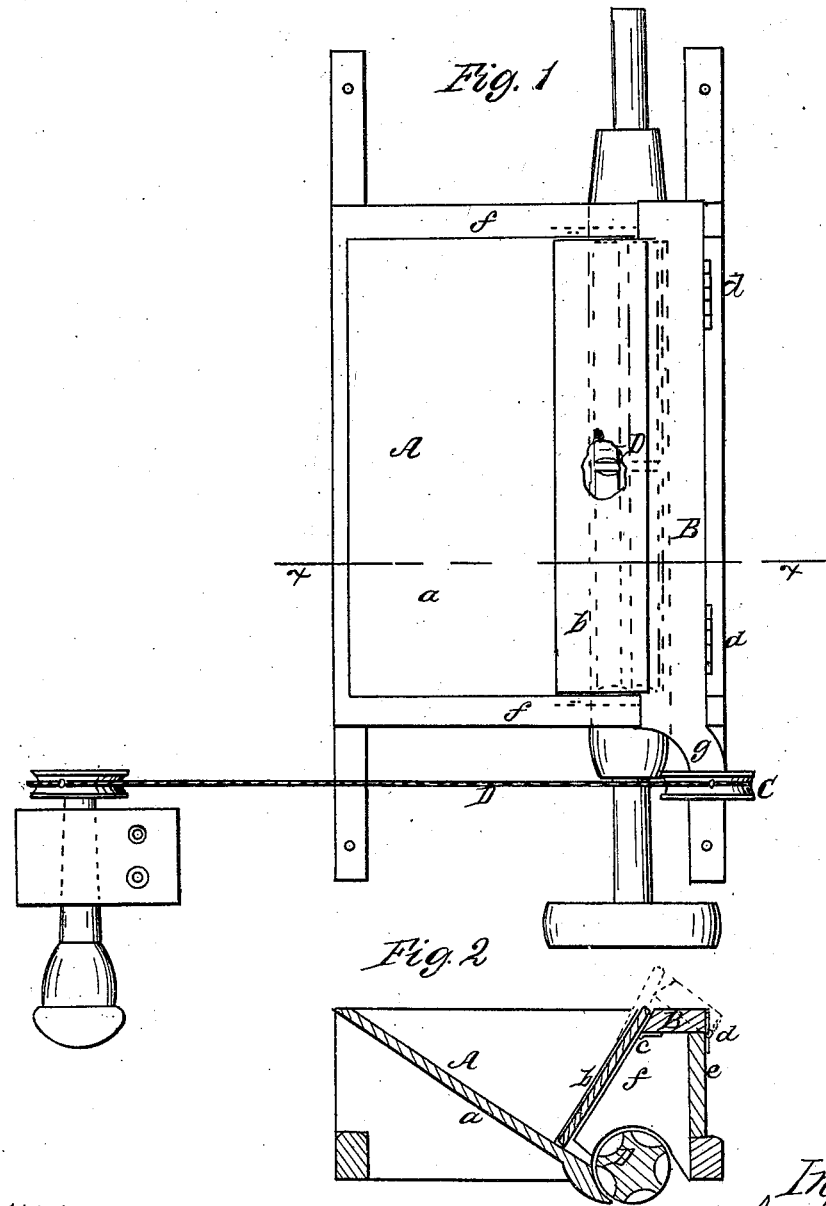

JOHN S. BODGE, OF BATH, NEW YORK.

IMPROVEMENT IN FEED-REGULATING MECHANISM FOR HOPPERS.

Specification forming part of Letters Patent No. 48,646, dated July 11, 1865.

*To all whom it may concern:*

Be it known that I, JOHN S. BODGE, of Bath, in the county of Steuben and State of New York, have invented a new and Improved Feed-Regulating Mechanism for Hoppers; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a transverse vertical section of the same, taken in line $x\ x$, Fig. 1.

Similar letters of reference indicate corresponding parts.

The object of this invention is to obtain a means whereby grain and other substances may be fed from hoppers to the machine designed for them in greater or less quantity, as may be desired, and the feed regulated from a distance—that is, from stories below that in which the hopper is placed.

The invention is more especially designed to be applied to the hoppers of grain-separators, but is applicable to other purposes.

A represents a hopper provided with inclined sides, as usual, one side, $a$, being fixed or stationary and the other side, $b$, being movable, or arranged in such a manner as to be capable of being raised and lowered, so that the hopper may be entirely closed at its lower end, or an opening allowed of greater or less capacity to admit of a more or less rapid discharge of the contents of the hopper, as may be required. The upper end of the side $b$ of the hopper is connected by hinges $c$ to a flap, B, the outer edge of which is secured by hinges $d$ to a strip, $e$, attached to the end pieces, $f\ f$, of the hopper. The flap B has one end extending beyond one of the end pieces $f$ of the hopper, forming an arm, $g$, on which a pulley, C, is keyed. This pulley C may be turned by means of a cord or belt, D, extending to any point from which it is most convenient to operate it, and it will be seen that by turning this pulley the flap B will be raised or lowered, and consequently the side $b$. At the bottom of the hopper, below the movable side $b$, there is a flanged drum, D, which insures the proper discharge of the substance within the hopper.

By this simple arrangement grain and other substances may be fed from hoppers to the machines designed for them in greater or less quantities—that is to say, with greater or less rapidity—as may be required, and the feed regulated at a distance from the hopper, for the cord or belt D may be carried down one or more stories below the one in which the hopper is placed.

The invention will be very convenient for the hoppers of grain-separators where the latter are necessarily elevated in buildings and mills to scour the stored grain, which is discharged after passing through the separator into stories below, either to be ground into flour or bagged for sale, for the attendant or operator will be enabled in stories below, where the cleansed grain is discharged and where his presence is required, to regulate the feed without the labor of frequently running up stairs, as is now required to effect that end.

Having thus described my invention, I claim as new and desire to secure by Letters Patent—

A hopper provided with a sliding side, $b$, arranged and operating as herein shown for the purpose of being raised and lowered to regulate the feed or the discharge of the contents of the hopper from the same, as set forth.

JOHN S. BODGE.

Witnesses:
C. A. STACY,
S. C. STACY.